United States Patent
Shida et al.

(10) Patent No.: US 6,358,622 B1
(45) Date of Patent: Mar. 19, 2002

(54) HEAT SEALABLE FILMS

(75) Inventors: Mitsuzo Shida, Long Grove; Mark R. Mueller, Plainfield; Mark S. Pucci, Elk Grove Village; John Machonis, Jr., Schaumburg, all of IL (US)

(73) Assignee: M.S.I. Technology L.L.C., Arlington Heights, IL (US)

( * ) Notice: Subject to any disclaimer, the term of this patent is extended or adjusted under 35 U.S.C. 154(b) by 0 days.

(21) Appl. No.: 09/465,875

(22) Filed: Dec. 16, 1999

(51) Int. Cl.[7] .............................................. B32B 27/08
(52) U.S. Cl. ....................... 428/500; 428/515; 428/516; 428/518; 428/511
(58) Field of Search ................................ 428/500, 515, 428/511, 516, 518

(56) References Cited

U.S. PATENT DOCUMENTS

| | | | |
|---|---|---|---|
| 4,279,344 A | 7/1981 | Holloway, Jr. | 206/631 |
| 4,346,196 A | 8/1982 | Hoh et al. | 428/500 |
| 4,469,754 A | 9/1984 | Hoh et al. | 428/476.3 |
| 4,539,263 A | 9/1985 | Hoh | 428/500 |
| 4,550,141 A | 10/1985 | Hoh | 525/221 |
| 4,680,340 A | 7/1987 | Oreglia et al. | 525/72 |
| 4,859,514 A | 8/1989 | Friedrich et al. | 428/36.9 |
| 4,870,134 A | 9/1989 | Hwo | 525/221 |
| 5,023,121 A | 6/1991 | Pockat et al. | 428/36.9 |
| 5,024,044 A | 6/1991 | Friedrich et al. | 53/433 |
| 5,066,543 A | 11/1991 | Hwo | 428/412 |
| 5,198,301 A * | 3/1993 | Hager et al. | 428/355 |
| 5,547,752 A | 8/1996 | Yanidis | 428/349 |
| H1727 H | 5/1998 | Jones et al. | 428/35.7 |
| 5,891,500 A | 4/1999 | Brodie, III | 426/415 |

* cited by examiner

Primary Examiner—Paul Thibodeau
Assistant Examiner—Monique R. Jackson
(74) Attorney, Agent, or Firm—Fitch, Even, Tabin & Flannery

(57) ABSTRACT

Improved packaging films which can be heat sealed and then easily opened when desired are provided. The heat sealable packaging films are prepared from ionomers, acid copolymers, or mixtures thereof which are modified with polypropylene, ethylene vinyl acetate copolymer, and, optionally, polyethylene. The resulting films are heat sealable with a relatively low heat seal initiation temperature and with consistent seal strengths over a relatively broad heat sealing temperature range. The heat seal strength, which is retained over time, can be varied or adjusted to desired values by adjusting the composition of the modified ionomer blend. The seal can be opened in a clean manner (i.e., not stringy). Since the seal whitens upon opening, the film of this invention allows for tamper evident packaging.

25 Claims, 3 Drawing Sheets

HEAT SEALABLE FILMS

FIELD OF THE INVENTION

This invention generally relates to improved packaging films which can be heat sealed and then easily opened when desired. More specifically, this invention relates to improved heat sealable packaging films prepared from (1) ionomers modified with polypropylene, ethylene vinyl acetate copolymer, and, optionally, polyethylene and (2) ethylene-carboxylic acid copolymers modified with polypropylene, ethylene vinyl acetate copolymer, and, optionally, polyethylene. The resulting films are heat sealable with a relatively low heat seal initiation temperature and with consistent seal strengths over a relatively broad heat sealing temperature range. The heat seal strength, which is retained over time, can be varied or adjusted to desired values by adjusting the composition of the modified ionomer and/or ethylene-carboxylic acid copolymer blends. When opened, the seal fails cohesively in a clean manner (i.e., not stringy). Since the seal whitens upon opening, the film of this invention allows for tamper evident packaging.

BACKGROUND OF THE INVENTION

Heat sealable and easily opening multilayer thermoplastic films are widely used in the packaging industry, especially for food products. These films are usually formed by coextrusion or coating equipment. An external layer of a heat sealable composition is used to form the heat seal with another layer of the heat sealable composition or another substrate material. Heat sealable, easy-opening packages made from polymeric materials are known in the art and are used in many packaging applications, including food packaging.

U.S. Pat. No. 4,279,344 (Jul. 21, 1981) provides a heat sealable, easy opening packaging compositions containing 15 to 35 percent ionomer with the balance being either polypropylene or a polypropylene-polyethylene copolymer (up to 5 percent polyethylene). These compositions required relatively high heat seal temperature (i.e., about 450° F.).

U.S. Pat. No. 4,346,196 (Aug. 24, 1982) and U.S. Pat. No. 4,469,754 (Sep. 4, 1984) provide heat seal compositions of 20 to 80 percent ionomer and 20 to 80 percent of a terpolymer (ethylene, vinyl alkanoate or ester, and ethylenically unsaturated monocarboxylic acid). U.S. Pat. No. 4,550,141 (Oct. 29, 1985) and U.S. Pat. No. 4,539,263 (Sep. 3, 1985) provide heat sealable and peelable compositions containing 80 to 93 percent ionomer and 7 to 20 percent of a propylene/α-olefin copolymer. Polypropylene homopolymers did not form satisfactory heat sealable compositions when combined with ionomers.

U.S. Pat. No. 4,689,340 (Jul. 14, 1987) provides a heat sealable composition containing up to 40 percent of a first polymer with a melt flow index of less than 5 and 60 percent or more of a second polymer having a melt flow index of greater than 20. The first polymer may be an ionomer or an ethylene vinyl acetate copolymer. The second polymer is selected from the group consisting of low density polyethylene, ethylene/vinyl acetate copolymers, and modified ethylene/vinyl acetate copolymers. When the first polymer is an ethylene/vinyl acetate copolymer, the second polymer must be a low density polyethylene.

U.S. Pat. No. 4,859,514 (Aug. 22, 1989) provides a sealing system having first and second webs which are heat sealed together to form the seal. The first web is an ionomer or an ionomer-ethylene vinyl acetate copolymer blend. The second web is a blend of ethylene vinyl acetate copolymer, ethylene 1-butene copolymer, and polypropylene.

U.S. Pat. No. 5,023,121 (Jun. 11, 1991) also provides a sealing system having first and second webs which are heat sealed together to form the seal. The first web includes a sealant layer which is a blend of polybutene and polypropylene and a third polymeric material selected from the group consisting of: (i) ethylene vinyl acetate copolymer; (ii) low density polyethylene; (iii) linear low density polyethylene; and (iv) ionomer. The second web includes a sealant layer consisting essentially of a polymeric material selected from the group consisting of ethylene vinyl acetate copolymer, low density polyethylene, linear low density polyethylene, ionomer, and mixtures thereof. An additional layer of polymeric adhesive can be placed adjacent to and bonded to the sealant layer of the first web.

U.S. Pat. No. 5,547,752 (Aug. 20, 1996) provides heat seal compositions having 15 to 50 percent of an isotactic nonelastomeric polybutylene and 50 to 85 percent ionomer. U.S. Statutory Invention Registration H1 727 (May 5, 1998) provides a heat sealable multiple layer film having an outer layer and an adjacent interior layer. The interior layer is a blend of polypropylene and a primary resin selected from the group ionomer, ethylene vinyl acetate, low density polyethylene, and linear low density polyethylene. The exterior layer is a blend of a polybutylene and a copolymer such as low density polyethylene, linear low density polyethylene, ethylene vinyl acetate, ethylene acrylic acid, or ionomer. U.S. Pat. No. 5,891,500 (Apr. 6, 1999) provides heat sealable compositions which are blends of ionomer and polybutylene.

U.S. Pat. No. 4,870,134 provides heat sealable films formed from blends of an ethylene-carboxylic acid copolymer, a butene-1 homopolymer or copolymer, and a propylene homopolymer or copolymer. U.S. Pat. No. 5,066,543 provides heat sealable films formed from blends of an ethylene-carboxylic acid copolymer, a butene-1 homopolymer or copolymer, and an ethylene homopolymer or an ethylene unsaturated ester copolymer.

There still remains a need for heat sealable, easy opening packaging systems having improved performance. Such a system would provide low heat seal initiation temperatures with consistent heat seal strengths over a relatively wide range of heat sealing temperatures. Ideally, such a system would allow for easily adjustment of the heat seal strength for specific applications and provide a heat seal strength that remains essentially unchanged over time. Such a system would also provide for an easy opening seal which opens smoothly and cleanly (i.e., not stringy) with a uniform peel force. It would also be beneficial if the packaging system could provide a built-in tamper evident feature that would allow the consumer to readily determine if the package had been previously opened. The present invention provides such an improved heat sealable, easy opening packaging system.

SUMMARY OF THE INVENTION

This invention generally relates to heat sealable films comprising ionomer resin, polypropylene, ethylene vinyl acetate copolymer, and, optionally, polyethylene and to heat sealable films comprising ethylene-carboxylic acid copolymers modified with polypropylene, ethylene vinyl acetate copolymer, and, optionally, polyethylene. More particularly, the heat sealable films of this invention are formed from blends of about 50 to about 99 percent ionomer resin, ethylene-carboxylic acid copolymers, or mixtures thereof; about 0.5 to about 25 percent polypropylene; about 0.5 to about 25 percent ethylene-vinyl acetate copolymer; and about 0 to about 25 percent polyethylene. More preferably, the heat sealable films of this invention are formed from blends of about 60 to about 95 percent ionomer resin, ethylene-carboxylic acid copolymers, or mixtures thereof; about 2.5 to about 20 percent polypropylene; about 2.5 to about 20 percent ethylene vinyl acetate copolymer; and about 0 to about 10 percent polyethylene. Preferably the polypropylene is a homopolymer. The heat sealable films of this invention are ideally suited for extrusion coating and/or coextrusion with other film materials to form heat sealable multilayer or composite films. In such multilayer films, the present heat sealable film may be heat sealed to itself or to another film material.

The heat sealable films of this invention are especially useful in food packaging applications. The heat seal strength can be varied and controlled over a relatively large range (i.e., about 0.5 to about 4 lbs/in or about 9 to about 71 g/mm). Moreover, the present films also exhibit low heat seal initiation temperatures and a relatively flat heat seal strength profile at higher heat seal temperatures. The heat seal strength remains essentially unchanged over time. Additionally, when peeled apart, the films of this invention separate cleanly and smoothly (i.e., not stringy) under a uniform peel force. Moreover, the films of this invention visibly whiten when opened and can, therefore, be used as tamper evident packaging.

One object of the present invention is to provide a heat sealable composition comprising a blend of about 50 to about 99 percent carboxylic acid-containing resin, about 0.5 to about 25 percent polypropylene, about 0.5 to about 25 percent ethylene vinyl acetate copolymer, and about 0 to about 25 percent polyethylene, wherein the carboxylic acid-containing resin is an ionomer, an ethylene-carboxylic acid copolymer, or a mixture thereof and wherein the heat sealable composition can be heat sealed to itself or another substrate to form a heat seal with a heat seal strength of about 0.5 to about 4.0 pounds per inch. Generally, heat sealable compositions containing ionomers are preferred.

Another object of this invention is to provide a flexible heat sealable multiple layer packaging film, said film comprising at least one layer of a heat sealable adhesive material and at least one layer of a polymeric packaging film, wherein the heat sealable adhesive material comprises about 50 to about 99 percent carboxylic acid-containing resin, about 0.5 to about 25 percent polypropylene, about 0.5 to about 25 percent ethylene vinyl acetate copolymer, and about 0 to about 25 percent polyethylene, wherein the carboxylic acid-containing resin is an ionomer, an ethylene-carboxylic acid copolymer, or a mixture thereof and wherein the heat sealable adhesive material can be heat sealed to itself or to a substrate to form a peelable and easy opening heat seal with a heat seal strength of about 0.5 to about 4.0 pounds per inch. The heat sealable adhesive material can be heat sealed to itself or to other flexible polymeric packaging films (including other layers of the multiple layer packaging film or other packaging films not containing a layer of the heat sealable adhesive material).

Still another object of the present invention is to provide a method of preparing a flexible heat sealable multiple layer packaging film, said method comprising:

(1) providing a homogenous blend of a heat sealable adhesive material comprising about 50 to about 99 percent carboxylic acid-containing resin, about 0.5 to about 25 percent polypropylene, about 0.5 to about 25 percent ethylene vinyl acetate copolymer, and about 0 to about 25 percent polyethylene, wherein the carboxylic acid-containing resin is an ionomer, an ethylene-carboxylic acid copolymer, or a mixture thereof; and (2) forming a multiple layer flexible film having an exposed layer of the homogenous blend and at least one layer of other polymeric material or paper, wherein the exposed layer of the homogenous blend can be heat sealed to form a peelable heat seal with itself or another substrate and wherein the heat seal has a heat seal strength of about 0.5 to about 4 pounds per inch.

These and other objects and advantages of the present invention will be apparent to those of ordinary skill in the art upon consideration of the present specification.

DETAILED DESCRIPTION OF THE INVENTION

Figure 1:
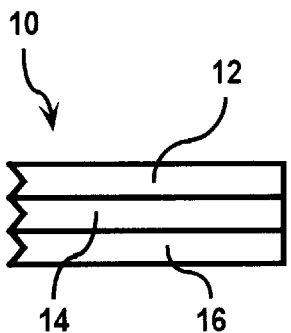
FIG. 1 illustrates a multiple layer film of the present invention having an exposed heat sealable layer and multiple substrate layers.

An improved heat sealable composition is provided by the present invention. This heat sealable composition is especially useful in preparing heat sealable, flexible, multiple layered films which can be used, for example, to package food products. The heat sealable composition or material comprises a blend of about 50 to about 99 percent carboxylic acid-containing resin, about 0.5 to about 25 percent polypropylene, about 0.5 to about 25 percent ethylene vinyl acetate copolymer, and about 0 to about 25 percent polyethylene. The carboxylic acid-containing resin is an ionomer resin, an ethylene-carboxylic acid copolymer, or a mixture thereof. More preferably, the heat sealable films of this invention are formed from blends of about 60 to about 95 percent carboxylic acid-containing resin, about 2.5 to about 20 percent polypropylene, about 2.5 to about 20 percent ethylene vinyl acetate copolymer, and about 0 to about 10 percent polyethylene. Preferably, the polypropylene and the ethylene vinyl acetate copolymer components are in included in the composition in roughly equal amounts (i.e., a ratio of about 1:1).

The heat sealable compositions of this invention may also include minor amounts of slip agents, antiblocking agents, release agents, and other conventional additives used in the manufacture of heat sealable polymeric materials. Such additives, if used, should be at a level so as not to significantly effect the heat sealable and peelable properties of the heat sealable and pealable composition in an adverse manner while still providing the desired benefit.

The carboxylic acid-containing resins used in this invention include ionomers, etheylene-carboxylic acid copolymers, and mixtures thereof. The ionomers resins used in the present invention are well known in the art. Such ionomers are polar polymers (i.e., containing both negative and positive groups) having both ionic and covalent cross linking. Suitable ionomers include film-forming copolymers prepared from olefins and ethylenically unsaturated monocarboxylic acids where at least about 5 percent of the carboxylic acid groups are neutralized using a metal ion. Suitable metal ions aınclude ammonium, lithium, sodium, potassium, calcium, magnesium, and zinc; mixtures of such metal ions may also be used if desired. Sodium and zinc are generally preferred. In addition to direct neutralization, the desired degree of neutralization of the carboxylic acid groups in the ionomer can be obtained by blending a more highly neutralized ionomer with an appropriate amount of an unneutralized or a partially neutralized ionomer.

The olefins used to prepare the ionomer have the general formula $RCH=CH_2$ where R is hydrogen or an alkyl group having 1 to 8 carbon atoms. Preferably the olefin is ethylene (i.e., R is hydrogen). Suitable carboxylic acid monomers include monoethylenically unsaturated monobasic acids having 3 to 8 carbon atoms such as, for example, acrylic acid, methacrylic acid, ethacrylic acid, itaconic acid, alkyl hydrogen maleic acid, and fumaric acid. Preferred carboxylic acid monomers include acrylic and methacrylic acid because they are thermally stable and commercially available.

The ionomer generally contains at least about 50 mole percent olefin units and about 0.2 to about 25 mole percent carboxylic acid units. More preferably, the ionomer contains at least about 80 mole percent olefin units and about 5 to about 15 mole percent carboxylic acid units. Generally, at least about 5 percent of the carboxylic acid groups are neutralized. Suitable ionomers can be prepared by methods well known in the art such as, for example, as described in U.S. Pat. Nos. 3,264,272, 3,404,134, and 3,355,319, each of which is incorporated by reference. Especially preferred and commercially available ionomers include SURLYN™ ionomers (E. I. du Pont de Nemours and Company) and lotek™ ionomers (Exxon Chemical Company). Preferably, the melt index of the ionomer resins used in the present invention is in the range of about 0.2 to about 20 dg/min (ASTM D1238; 190° C./2.16 kg).

The ethylene-carboxylic acid copolymers used in the present invention are also well known in the art. Generally the ethylene-carboxylic acid copolymers useful in this invention include, but are not limited to, ethylene acrylic acid (EM) copolymers, ethylene methyl acrylic acid (EMAA) copolymers, ethylene ethyl acrylic acid (EEAA) copolymers, ethylene butyl acrylic acid (EBM) copolymers, and ethylene propyl acrylic acid (EPM) copolymers. Generally, the ethylene-carboxylic acid copolymer should contain at least about 50 mole percent ethylene and, more preferably, about 85 to about 95 mole percent ethylene. Generally, the ethylene-carboxylic acid copolymer should contain at least about 0.2 to about 25 mole percent carboxylic acid groups and, more preferably, about 5 to about 15 mole percent carboxylic acid groups. Such ethylene-carboxylic acid copolymers are prepared from ethylene and suitable carboxylic acid monomers including monoethylenically unsaturated monobasic acids having 3 to 8 carbon atoms such as, for example, acrylic acid, methacrylic acid, ethacrylic acid, itaconic acid, alkyl hydrogen maleic acid, and fumaric acid. Suitable ethylene-carboxylic acid copolymers include, for example, copolymers from E.I. du Pont de Nemours and Company (DuPont) under the trade name Nucrel™, from Dow Chemical Company under the trade name Primacor™, and from Exxon Chemical Company under the trade name Escor™.

The polypropylenes used in the peelable heat seal compositions of the present invention may be either homopolymers or copolymers. Copolymers may include a relatively small amount (i.e., generally less than about 10 percent) of olefins such as ethylene, butene-1, pentene-1, hexane-1, heptene-1, octane-1, 3-methyl-butene-1, and 4-methyl-butene-1; generally, ethylene is the preferred olefin due to its relatively low cost and commercial availability. Generally the polypropylene homopolymers are preferred. Polypropylenes having melt flow rates of about 0.2 to about 50 dg/min (ASTM D1238; 230° C./2.16 kg) are generally suitable for use in the present invention. Polypropylenes having melt flow rates of about 1 to about 10 dg/min are generally preferred. Suitable polypropylenes are available commercially from, for example, Equistar Chemicals, LP, Fina Oil and Chemical Company, and Exxon Chemical Company.

The ethylene vinyl acetate copolymers used in the present invention are also commercially available. Generally suitable ethylene vinyl acetate copolymers contain about 1 to about 30 percent vinyl acetate units. Preferably the ethylene vinyl acetate copolymer has about 5 to 20 percent vinyl acetate units and a melt index of about 0.5 to about 10 dg/min (ASTM D1238; 190° C./2.16 kg). Such copolymers can be obtained, for example, from Equistar Chemicals, LP, under the trade name Ultrathene™; from Exxon Chemical Company under the trade name Escorene™; and from E. I. du Pont de Nemours and Company (DuPont) under the trade name Elvax™. Although not wishing to be limited by theory, it appears that the ethylene vinyl acetate copolymer assists in rendering the ionomer and polypropylene components compatible and allows the formation of a homogenous mixture on a molecular level.

Relatively low amounts of polyethylene may be included in the heat sealable compositions of this invention if desired. Again not wishing to be limited by theory, it appears that the addition of polyethylene further assists in rendering the carboxylic acid-containing resin and polypropylene components compatible. Suitable polyethylenes are commercially available and include, for example, high-density polyethylenes (HDPE), medium-density polyethylenes (MDPE), low-density polyethylenes (LDPE), linear low-density polyethylenes (LLDPE), and very low-density polyethylenes (VLDPE). If used in the heat sealable compositions of this invention, the polyethylene is preferably in the range of about 1 to about 10 percent.

The heat sealable compositions of this invention are prepared by forming a homogenous mixture, on the molecular level, of the various components. For example, the various components could be melt blending with adequate dispersion and mixing to form the homogenous composition. Such a melt-blended homogenous composition could be solidified to form pellets or other solid forms for later use or could be used directly (i.e., without an intermediate solidifying step) in a film forming operation (e.g., extrusion, coextrusion, coating, and the like). Other mixing techniques can be used. For example, a high shear mixer could be used to form the homogenous blend. The components can also be dry blended so long as the various components are of sufficiently small particle sizes to allow for homogenous mixtures to be formed. As those skilled in the art realize, the mixture is considered homogenous if, once the composition is formed into the desired film, the heat seal properties remain consistent from one location or area to other locations or areas of the film. In other words, heat seals formed from the composition should have comparable heat seal strengths and peeling characteristics throughout the heat sealed area.

The present heat sealable composition or sealant can be formed into film using conventional film forming processes and techniques. Suitable films can be formed using blown, cast, coating, lamination, or extrusion processes and techniques. Preferably, the heat sealable films of this invention are prepared using coextrusion techniques. FIG. 1 illustrates a three layered film 10 having an exposed heat sealable layer 12 and two substrate layers 14 and 16 that could be formed by coextrusion. For purposes of this invention, an "exposed layer" is intended to mean an exterior flat surface of the multiple layer film which is capable of being heat sealed to itself or to another substrate. Of course, as those skilled in the art will realize, additional layers could be included depending on the desired use intended for the film. Moreover, layers 14 and 16 (as well as other layers) could be formed using any conventional film material. Moreover, the ordering of the layers in such a multiple layer film could be modified for specific applications so long as the inventive carboxylic acid-containing resin composition is exposed for heat sealing. Again as those skilled in the art will realize, the overall thickness as well as the thickness of the various layers of such multiple layered film can be varied widely to accommodate different applications and uses. For food packaging materials, an overall thickness of about 1 to about 10 mils is generally preferred. The exposed heat sealable layer is preferably about 0.1 to about 1 mils. Of course, as those skilled in the art will realize, other thicknesses for both the overall film and the heat sealable layer can be used if desired and may, in some cases and applications, be preferred.

The inventive heat sealable composition, preferably in film form, can be heat sealed to itself (i.e., heat sealable composition layer to heat sealable composition layer) or to another substrate. Substrates to which the heat sealable composition can be heat sealed include, for example, ionomer, carboxylic acid copolymer, ethylene vinyl acetate copolymer, polyethylene, and the like.

The heat sealable compositions of this invention can be used in, for example, packaging for food products, medical devices and supplies, and electronic components where an easy opening feature is desired. Generally, a heat seal strength of about 0.5 to about 4.0 lbs/in is desired in such applications to allow the packaging to be opened easily. As shown in the following examples, the compositions of this invention can be formulated to obtain a desired heat seal strength within this range. By varying the amounts of ethylene vinyl acetate copolymer and polypropylene, the average heat seal strength can be varied. As also shown in the examples, the heat seal strength of the heat sealable compositions of this invention have a relatively low heat seal initiation temperature and are essentially independent of the heat seal temperature above that initiation temperature. This is especially advantageous since it is often difficult, and costly, to precisely control the temperature using conventional heat sealing equipment.

Additionally, the heat seals formed using the present invention, when opened, peel apart cleanly (i.e., not stringy). When heat sealed, and up until the time the seal is first broken (i.e., the initial opening of the package), the sealed material is generally transparent. When opened, the seal material provides a cloudy or whitish appearance. This stress "whitening" can be used in tamper evident packaging.

The following examples are intended to illustrate the present invention and not to limit it. Unless otherwise noted, all percentages and ratios are by weight.

EXAMPLE 1

Heat sealable ionomer compositions containing a Surlyn™ sodium ionomer were prepared using a three-zone, 1.25 inch, single-screw Killion extruder using the following temperature profile: zone 1: 375° F.; zone 2: 400° F.; zone 3: 425° F.; mixing section: 450° F.; and die: 450° F. Care was taken to insure mixing and dispersion of the components in the mixing section. The polymer blend was extruded through a two-strand die, then cooled in a water bath, and pelletized. The ionomer heat sealable compositions were prepared having the following components:

| Blend | Ionomer (%) | Ethylene Vinyl Acetate Copolymer (%) | Polypropylene Homopolymer (%) | Polypropylene Copolymer (%) | Polyethylene (%) |
|---|---|---|---|---|---|
| 1 | 95 | 2.5 | 2.5 | 0 | 0 |
| 2 | 93 | 3.5 | 3.5 | 0 | 0 |
| 3 | 90 | 5 | 5 | 0 | 0 |
| 4 | 90 | 5 | 0 | 5 | 0 |
| 5 | 90 | 4 | 5 | 0 | 1 |

The ionomer used was Surlyn™ 1601 from Dupont which is a sodium ionomer having a melt index of 1.3 dg/min. The ethylene vinyl acetate copolymer was Exxon Escorene LD409.09 copolymer containing 9.9 percent vinyl acetate with a melt index of 4.1 dg/min and a density of 0.927 g/cc. The polypropylene homopolymer was Exxon Escorene PP4292E1 having a melt flow rate of 1.5 dg/min. The polypropylene copolymer was Fina 6253 which contains about 2 percent ethylene and has a melt flow rate of 1.5 dg/min. The polyethylene (Equistar Petrothene NA952-000) is a low-density polyethylene resin with a melt index of 2.0 dg/min and a density of 0.918 g/cc.

Films were made on a 7-layer, 4-extruder, coextrusion blown film line. Films (about 2.5 mils thick) were prepared having the following configuration: A/B/CC/DDD. Layer A was the heat sealable ionomer composition (about 15 to 20 percent of the total film thickness). Layer B was ethylene vinyl acetate copolymer (Exxon Escorene LD705; 13.3 percent vinyl acetate). The C and D layers were formed from high density polyethylene (Equistar Alathon L5885; melt index of 0.85 dg/min and density of 0.959 g/cc).

The resulting films were heat sealed to themselves (i.e., layer A to layer A) or to a Surlyn™ 1601 substrate film (i.e., layer A to the substrate film). Films aged for different time periods (i.e., immediately after coextrusion; one day after coextrusion; and six days after coextrusion) were heat sealed using a seal pressure of 40 psi and a dwell time of 1 second. The heat seal temperature was varied. After heat sealing, the heat seal strengths were measured using at least three heat sealed samples for each blend. Heat seal strengths were measured using a Tinius-Olsen tensile tester. The following averaged were obtained:

TABLE 1

Heat Seal Strengths (lbs/in) of Heat Sealable Ionomer Compositions Heat Sealed to Surlyn ™ 1601 Substrate

| Blend | Film Aging Time (days) | Heat Seal Temperature (° F.) | | | | | | |
|---|---|---|---|---|---|---|---|---|
| | | 210 | 230 | 250 | 270 | 290 | 310 | 330 |
| 1 | 0 | 1.27 | 1.32 | 1.69 | 1.76 | 1.91 | 1.82 | — |
| | 1 | 1.41 | 1.60 | 1.78 | 1.78 | 1.99 | 1.83 | 2.07 |
| | 6 | 1.19 | 1.52 | 1.72 | 1.71 | 1.81 | 1.77 | 1.74 |

TABLE 1-continued

Heat Seal Strengths (lbs/in) of Heat Sealable Ionomer Compositions Heat Sealed to Surlyn ™ 1601 Substrate

| Blend | Film Aging Time (days) | Heat Seal Temperature (° F.) | | | | | | |
|---|---|---|---|---|---|---|---|---|
| | | 210 | 230 | 250 | 270 | 290 | 310 | 330 |
| 2 | 0 | 1.21 | 1.21 | 1.45 | 1.29 | 1.55 | 1.45 | — |
| | 1 | 1.18 | 1.24 | 1.45 | 1.29 | 1.55 | 1.45 | 1.54 |
| | 6 | 1.03 | 1.15 | 1.29 | 1.32 | 1.45 | 1.44 | 1.51 |
| 3 | 0 | 0.75 | 0.96 | 0.89 | 0.96 | 0.96 | 0.94 | — |
| | 1 | 0.84 | 0.89 | 0.93 | 1.03 | 1.07 | 1.11 | 1.24 |
| | 6 | 0.77 | 0.93 | 0.84 | 0.97 | 1.04 | 1.25 | 1.24 |
| 4 | 0 | 0.44 | 0.96 | 1.08 | 1.00 | 1.09 | 1.03 | 1.20 |
| | 1 | 0.76 | 0.96 | 0.97 | 0.97 | 1.12 | 1.09 | 1.20 |
| | 6 | 0.76 | 0.97 | 0.87 | 1.03 | 1.13 | 1.24 | 1.18 |
| 5 | 0 | 0.80 | 0.79 | 0.94 | 0.97 | 0.97 | 1.03 | 1.10 |
| | 1 | 0.76 | 0.91 | 0.90 | 1.03 | 1.07 | 0.99 | 1.07 |
| | 6 | 0.83 | 0.86 | 0.89 | 0.86 | 0.90 | 0.92 | 0.96 |

Figure 2A:
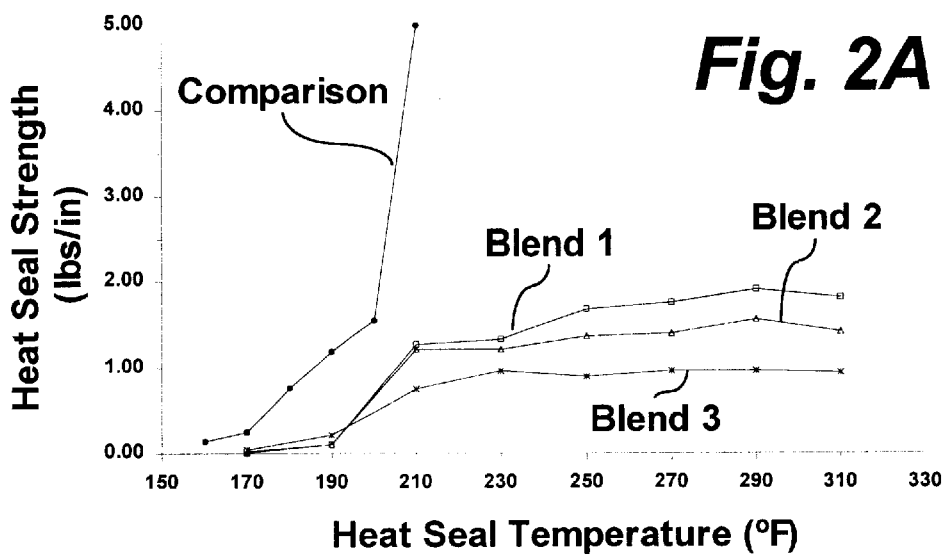
FIG. 2 illustrates heat seal strength as a function of the heat seal temperature for embodiments of the present invention in which the heat sealable ionomer compositions are heat sealed to a Surlyn™ film substrate. Panel A illustrates heat seal strengths obtained using unaged film (i.e., heat sealed within 30 minutes of film extrusion); Panel B illustrates heat seal strengths using film aged one day (i.e., heat sealed one day after film extrusion); and panel C illustrates heat seal strengths using file aged six days.
Figure 2B:
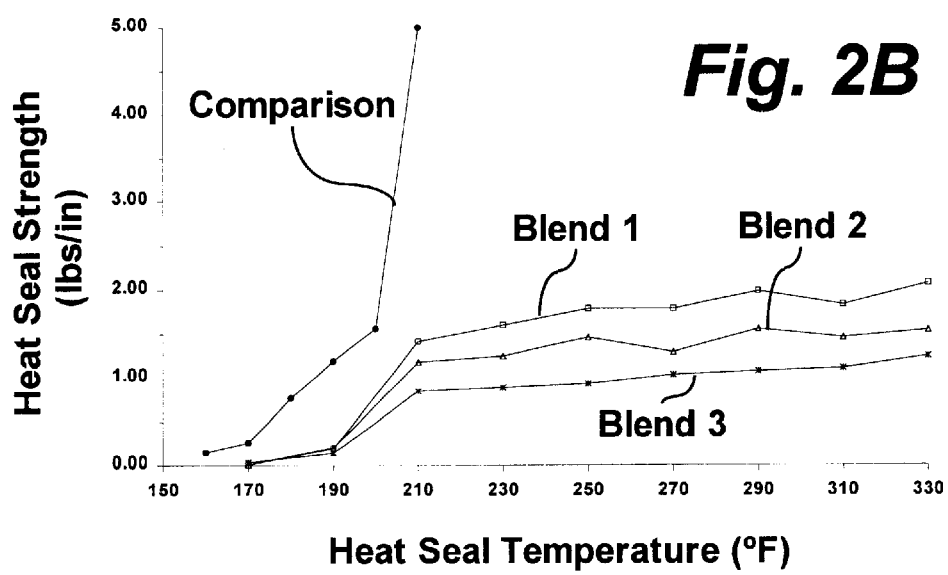
Figure 2C:
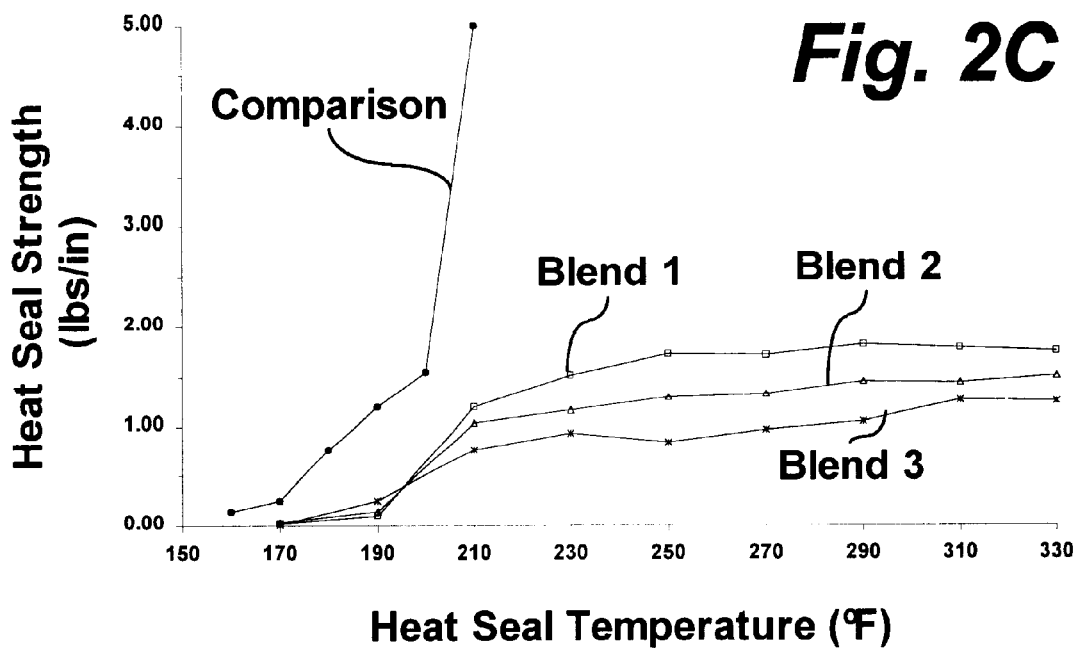

FIG. 2 illustrates the heat strength data (Table 1) for blends 1, 2, and 3 heat sealed to Surlyn™ using films which had been aged for varying lengths of time (i.e., films were aged for 0 to 6 days before being heat sealed). FIG. 2A illustrates the heat strengths obtained with film aged 0 days; FIG. 2B illustrates the heat strengths obtained with film aged for 1 day; and FIG. 2C illustrates the heat strengths obtained with film aged for 6 days. Heat strength values for Surlyn™ heat sealed to Surlyn™ are also included for comparison.

TABLE 2

Heat Seal Strengths (lbs/in) of Heat Sealable Ionomer Compositions Heat Sealed to Itself

| Blend | Film Aging Time (days) | Heat Seal Temperature (° F.) | | | | | | |
|---|---|---|---|---|---|---|---|---|
| | | 210 | 230 | 250 | 270 | 290 | 310 | 330 |
| 1 | 0 | 1.28 | 1.40 | 1.59 | 1.62 | 1.65 | 1.86 | — |
| | 1 | 1.23 | 1.23 | 1.52 | 1.54 | 1.66 | 1.78 | 1.70 |
| | 6 | 0.41 | 1.22 | 1.27 | 1.49 | 1.73 | 1.87 | 1.62 |
| 2 | 0 | 0.82 | 1.08 | 1.20 | 1.15 | 1.29 | 1.34 | — |
| | 1 | 0.75 | 1.04 | 1.13 | 1.15 | 1.31 | 1.40 | 1.33 |
| | 6 | 0.99 | 1.09 | 1.19 | 1.13 | 1.38 | 1.48 | 1.44 |
| 3 | 0 | 0.51 | 0.76 | 0.79 | 0.82 | 0.82 | 0.93 | — |
| | 1 | 0.19 | 0.60 | 0.71 | 0.77 | 0.83 | 0.89 | 0.92 |
| | 6 | 0.66 | 0.70 | 0.77 | 0.80 | 0.89 | 1.13 | 1.03 |
| 4 | 0 | 0.64 | 0.76 | 0.88 | 0.82 | 0.82 | 0.83 | 1.28 |
| | 1 | 0.34 | 0.79 | 0.80 | 0.90 | 0.86 | 1.01 | 1.03 |
| | 6 | 0.69 | 0.72 | 0.83 | 0.86 | 0.98 | 1.11 | 1.06 |
| 5 | 0 | 0.38 | 0.72 | 0.73 | 0.81 | 0.81 | 0.85 | 0.96 |
| | 1 | 0.56 | 0.70 | 0.76 | 0.85 | 0.85 | 0.88 | 0.90 |
| | 6 | 0.54 | 0.71 | 0.74 | 0.80 | 0.84 | 0.95 | 0.81 |

Figure 3A:
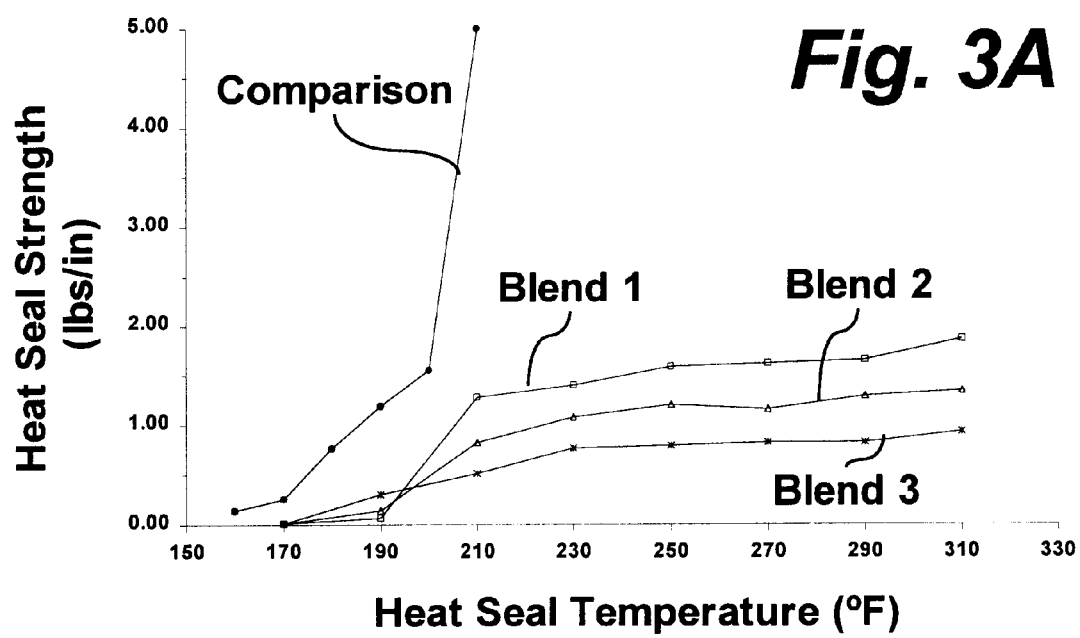
FIG. 3 illustrates heat seal strength as a function of the heat seal temperature for embodiments of the present invention in which the heat sealable ionomer compositions are heat sealed to themselves. Panel A illustrates heat seal strengths obtained using unaged film (i.e., heat sealed within 30 minutes of film extrusion); Panel B illustrates heat seal strengths using film aged one day (i.e., heat sealed one day after film extrusion); and panel C illustrates heat seal strengths using film aged six days.
Figure 3B:
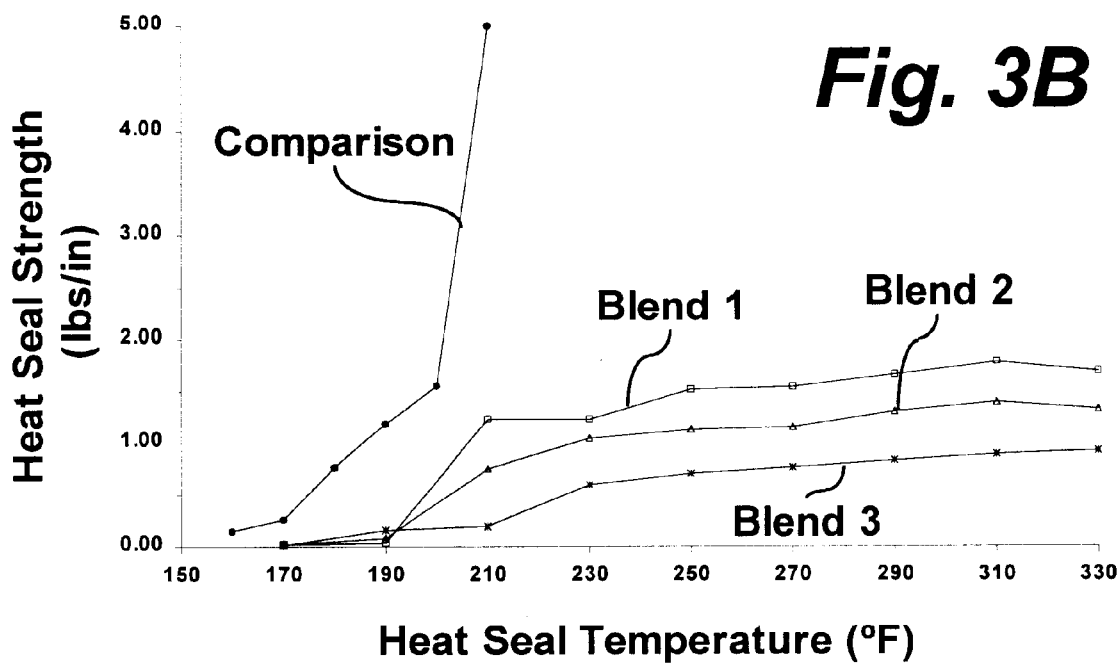
Figure 3C:
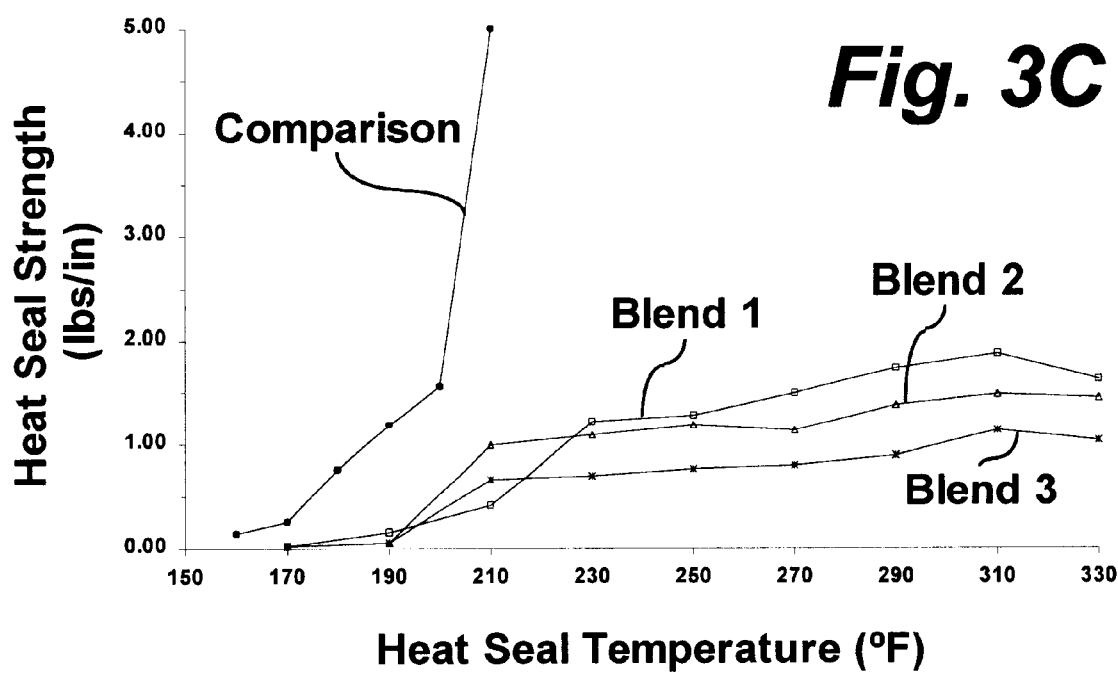

FIG. 3 illustrates the heat strength data (Table 2) for blends 1, 2, and 3 heat sealed to themselves immediately after heat sealing (FIG. 3A), after aging for 1 day (FIG. 3B), and after aging for 6 days (FIG. 3C). A comparative sample (Surlyn™ heated sealed to Surlyn™) is also included. Similar plots (not shown) for Blends 4 and 5 show similar trends as illustrated in FIGS. 2 and 3.

As shown in FIGS. 2 and 3, the heat sealable compositions of the present invention generally have a heat seal initiation temperature of about 210° F. Above this heat sealing temperature, the heat seal strengths are essentially unchanged up to temperatures of about 330° F. Thus, above the initiation temperature, heat seal strengths are essentially independent of the heat sealing temperature. As also illustrated in FIGS. 2 and 3 (as well as Tables 1 and 2), aging has little effect on the heat seal strengths.

EXAMPLE 2

Heat sealable ionomer compositions containing a Surlyn™ zinc ionomer were prepared and evaluated essentially as described in Example 1. The following heat sealable compositions were prepared and then heat sealed to a Surlyn™ 1650 substrate:

| Blend | Ionomer (%) | Ethylene Vinyl Acetate Copolymer (%) | Polypropylene Homopolymer (%) | Polyethylene (%) |
|---|---|---|---|---|
| 6 | 93 | 3.2 | 3.3 | 0.5 |
| 7 | 90.2 | 4.4 | 4.7 | 0.7 |
| 8 | 86 | 6.3 | 6.8 | 0.9 |

The ionomer used was Surlyn™ 1650 from DuPont which is a zinc ionomer having a melt index of 1.3 dg/min. The ethylene vinyl acetate copolymer was Exxon Escorene LD409.09 copolymer containing 9.9 percent vinyl acetate with a melt index of 4.1dg/min and a density of 0.927 g/cc. The polypropylene homopolymer was Exxon Escorene PP4292E1 having a melt flow rate of 1.5 dg/min. The polyethylene (Exxon Escorene LL1002.38) is a linear low-density polyethylene resin with a melt index of 2.0 dg/min and a density of 0.918 g/cc.

The heat seal strengths were determined using the same procedures as in Example 1 and are included in Table 3.

TABLE 3

Heat Seal Strengths (Lbs/in) of Heat Sealable Ionomer Compositions Heat Sealed a Surlyn ™ 1650 Substrate

| Blend | Film Aging Time (days) | Heat Seal Temperature (° F.) | | | | | |
|---|---|---|---|---|---|---|---|
| | | 210 | 230 | 250 | 270 | 290 | 310 |
| 6 | 0 | 1.96 | 1.94 | 2.18 | 2.37 | 2.45 | 2.33 |
| | 1 | 1.93 | 1.98 | 2.45 | 2.17 | 2.41 | 2.41 |
| | 6 | 1.75 | 1.90 | 2.13 | 2.22 | 2.43 | 2.49 |
| 7 | 0 | 1.40 | 1.41 | 1.44 | 1.54 | 1.56 | 1.74 |
| | 1 | 1.12 | 1.44 | 1.42 | 1.44 | 1.50 | 1.47 |
| | 6 | 1.32 | 1.37 | 1.68 | 1.70 | 1.79 | 1.83 |
| 8 | 0 | 0.97 | 1.01 | 1.17 | 1.06 | 1.10 | 1.12 |
| | 1 | 0.93 | 1.02 | 1.10 | 1.12 | 1.16 | 1.26 |
| | 6 | 1.02 | 1.11 | 1.04 | 1.17 | 1.25 | 1.18 |

EXAMPLE 3

This example illustrates the preparation of heat sealable compositions using ethylene-carboxylic acid copolymers. Heat sealable ethylene-carboxylic acid copolymers compositions containing DuPont Nucre™ 903 ethylene-carboxylic acid copolymers were prepared and evaluated essentially as described in Example 1. The following heat sealable compositions were prepared and then heat sealed to a Nurel™ 903 substrate:

| Blend | Ethylene-Carboxylic Acid Copolymer (%) | Ethylene Vinyl Acetate Copolymer (%) | Polypropylene Homopolymer (%) |
|---|---|---|---|
| 9 | 80 | 10 | 10 |
| 10 | 60 | 20 | 20 |

The ethylene-carboxylic acid copolymer used was Nurel™ 903 from Dupont which is an ethylene-methacrylic acid copolymer resin having about 9 percent methyacrylic acid and a melt index of about 2.5 dg/min. The ethylene vinyl acetate copolymer was Exxon Escorene LD409.09 copolymer containing 9.9 percent vinyl acetate with a melt index of 4.1 dg/min and a density of 0.927 g/cc. The homopolymer was Exxon Escorene PP4292E1 having a melt flow rate of 1.5 dg/min.

The heat seal strengths were determined using the same procedures as in Example 1 except that the film was not aged before heat sealing. The in Table 4.

TABLE 4

Heat Seal Strengths (Lbs/in) of Ethylene-carboxylic Acid Copolymer Compositions Heat Sealed a Nurel ™ 903 Substrate.

| | Heat Seal Temperature (° F.) | | | | | |
|---|---|---|---|---|---|---|
| Blend | 210 | 230 | 250 | 270 | 290 | 310 |
| 9 | 1.48 | 1.70 | 1.80 | 1.78 | 1.85 | 2.42 |
| 10 | 0.64 | 0.67 | 0.64 | 0.64 | 0.64 | 0.71 |

That which is claimed is:

1. A heat sealable composition comprising a blend of about 50 to about 99 percent carboxylic acid-containing resin, about 0.5 to about 25 percent polypropylene, about 0.5 to about 25 percent ethylene vinyl acetate copolymer, and about 0 to about 25 percent polyethylene, wherein the carboxylic acid-containing resin is an ionomer, an ethylene-carboxylic acid copolymer, or a mixture thereof and wherein the heat sealable composition can be heat sealed to itself or another substrate to form a heat seal with a heat seal strength of about 0.5 to about 4.0 pounds per inch.

2. The heat sealable composition as defined in claim 1, wherein the blend is about 60 to about 90 percent carboxylic acid-containing resin, about 2.5 to about 20 percent polypropylene, about 2.5 to about 20 percent ethylene vinyl acetate copolymer, and about 0 to about 10 percent polyethylene.

3. The heat sealable composition as defined in claim 1, wherein the polypropylene and the ethylene vinyl acetate copolymer are present in about a 1 to 1 ratio.

4. The heat sealable composition as defined in claim 2, wherein the polypropylene and the ethylene vinyl acetate copolymer are present in about a 1 to 1 ratio.

5. The heat sealable composition as defined in claim 1, wherein the carboxylic acid-containing resin is an ionomer containing at least about 50 mole percent olefin groups and about 0.2 to about 25 mole percent carboxylic acid groups and wherein at least about 5 percent of the carboxylic acid groups are neutralized with sodium or zinc ions.

6. The heat sealable composition as defined in claim 5, wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

7. The heat sealable composition as defined in claim 2, wherein the carboxylic acid-containing resin is an ionomer containing at least about 50 mole percent olefin groups and about 0.2 to about 25 mole percent carboxylic acid groups and wherein at least about 5 percent of the carboxylic acid groups are neutralized with sodium or zinc ions.

8. The heat sealable composition as defined in claim 7, wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

9. The heat sealable composition as defined in claim 1, wherein the carboxylic acid-containing resin is an ethylene-carboxylic acid copolymer having about 85 to about 95 mole percent ethylene groups and about 5 to about 15 mole percent carboxylic acid groups.

10. The heat sealable composition as defined in claim 9, wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

11. The heat sealable composition as defined in claim 2, wherein the carboxylic acid-containing resin is an ethylene-carboxylic acid copolymer having about 85 to about 95 mole percent ethylene groups and about 5 to about 15 mole percent carboxylic acid groups.

12. The heat sealable composition as defined in claim 11, wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

13. A flexible heat sealable multiple layer packaging film, said film comprising at least one layer of a heat sealable adhesive material and at least one layer of a polymeric packaging film, wherein the heat sealable adhesive material comprises about 50 to about 99 percent carboxylic acid-containing resin, about 0.5 to about 25 percent polypropylene, about 0.5 to about 25 percent ethylene vinyl acetate copolymer, and about 0 to about 25 percent polyethylene, wherein the carboxylic acid-containing resin is an ionomer, an ethylene-carboxylic acid copolymer, or a mixture thereof and wherein the heat sealable adhesive material can be heat sealed to itself or to a substrate to form a peelable and easy opening heat seal with a heat seal strength of about 0.5 to about 4.0 pounds per inch.

14. The packaging film as defined in claim 13, wherein the layer of heat sealable adhesive material is about 60 to about 95 percent carboxylic acid-containing resin, about 2.5 to about 20 percent polypropylene, about 2.5 to about 20 percent ethylene vinyl acetate copolymer, and about 0 to about 10 percent polyethylene.

15. The packaging film as defined in claim 13, wherein the polypropylene and the ethylene vinyl acetate copolymer are present in about a 1 to 1 ratio.

16. The packaging film as defined in claim 14, wherein the polypropylene and the ethylene vinyl acetate copolymer are present in about a 1 to 1 ratio.

17. The packaging film as defined in claim 14, wherein the carboxylic acid-containing resin is an ionomer containing at least about 50 mole percent olefin groups and about 0.2 to about 25 mole percent carboxylic acid groups and wherein at least about 5 percent of the carboxylic acid groups are neutralized with sodium or zinc ions and wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

18. The packaging film as defined in claim 14, wherein the carboxylic acid-containing resin is an ethylene-carboxylic acid copolymer having about 85 to about 95 mole percent ethylene groups and about 5 to about 15 mole percent carboxylic acid groups and wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

19. A method of preparing a flexible heat sealable multiple layer packaging film, said method comprising:

(1) providing a homogenous blend of a heat sealable adhesive material comprising about 50 to about 99 percent carboxylic acid-containing resin, about 0.5 to about 25 percent polypropylene, about 0.5 to about 25 percent ethylene vinyl acetate copolymer, and about 0 to about 25 percent polyethylene, wherein the carboxylic acid-containing resin is an ionomer, an ethylene-carboxylic acid copolymer, or a mixture thereof; and (2) forming a multiple layer flexible film having an exposed layer of the homogenous blend and at least one layer of other polymeric material or paper, wherein the exposed layer of the homogenous blend can be heat sealed to form a peelable heat seal with itself or another substrate and wherein the heat seal has a heat seal strength of about 0.5 to about 4 pounds per inch.

20. The method as defined in claim 19, wherein the multiple layer flexible film is formed by coextruding the homogenous blend and with at least one layer of the other polymeric material.

21. The method as defined in claim 19, wherein the homogenous blend is about 60 to about 95 percent carboxylic acid-containing resin, about 2.5 to about 20 percent polypropylene, about 2.5 to about 20 percent ethylene vinyl acetate copolymer, and about 0 to about 10 percent polyethylene.

22. The method as defined in claim 20, wherein the polypropylene and the ethylene vinyl acetate copolymer are present in about a 1 to 1 ratio.

23. The method as defined in claim 21, wherein the polypropylene and the ethylene vinyl acetate copolymer are present in about a 1 to 1 ratio.

24. The method as defined in claim 20, wherein the carboxylic acid-containing resin is an ionomer containing at least about 50 mole percent olefin groups and about 0.2 to about 25 mole percent carboxylic acid groups and wherein at least about 5 percent of the carboxylic acid groups are neutralized with sodium or zinc ions and wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

25. The method as defined in claim 21, wherein the carboxylic acid-containing resin is an ethylene-carboxylic acid copolymer having about 85 to about 95 mole percent ethylene groups and about 5 to about 15 mole percent carboxylic acid groups and wherein the polypropylene is a homopolymer with a melt flow rate of about 0.2 to about 50 dg/min; and wherein the ethylene vinyl acetate copolymer contains about 5 to about 20 percent vinyl acetate copolymer and has a melt flow rate of about 0.5 to about 10 dg/min.

* * * * *